United States Patent
Lemmons et al.

(10) Patent No.: US 6,442,755 B1
(45) Date of Patent: Aug. 27, 2002

(54) ELECTRONIC PROGRAM GUIDE USING MARKUP LANGUAGE

(75) Inventors: Thomas R. Lemmons, Sand Springs; Jon C. Zaring, Tulsa, both of OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/227,358

(22) Filed: Jan. 8, 1999

Related U.S. Application Data

(60) Provisional application No. 60/091,975, filed on Jul. 7, 1998.

(51) Int. Cl.⁷ .................................................. H04N 7/10
(52) U.S. Cl. .............................. 725/47; 725/44; 725/51
(58) Field of Search ................................. 345/327, 328, 345/719, 723; 725/39, 40, 41, 47, 44, 48, 51, 50, 118

(56) References Cited

U.S. PATENT DOCUMENTS

| | | | |
|---|---|---|---|
| 5,589,892 A | 12/1996 | Knee et al. ................. 348/731 |
| 5,715,515 A | 2/1998 | Akins, III et al. ........... 455/4.1 |
| 5,768,539 A | 6/1998 | Metz et al. ............. 395/200.79 |
| 5,778,372 A | 7/1998 | Cordell et al. .............. 707/100 |
| 5,818,935 A * | 10/1998 | Maa ............................ 380/20 |
| 5,918,010 A * | 6/1999 | Appleman et al. ..... 395/200.33 |
| 6,005,565 A * | 12/1999 | Legall et al. ............... 345/327 |
| 6,020,880 A * | 2/2000 | Naimpally .................. 345/327 |
| 6,025,837 A * | 2/2000 | Matthews, III et al. ..... 345/327 |
| 6,049,831 A * | 4/2000 | Gardell et al. .............. 709/236 |
| 6,081,263 A * | 6/2000 | LaGall et al. ............... 345/327 |
| 6,208,335 B1 | 3/2001 | Gordon et al. |
| 6,222,530 B1 * | 4/2001 | Seguiera ..................... 345/327 |

FOREIGN PATENT DOCUMENTS

| | | | |
|---|---|---|---|
| EP | 0 823 798 A1 | 2/1998 | ............ H04H/1/00 |
| EP | 0 834 798 A2 | 4/1998 | ........... G06F/3/033 |
| EP | 0 836 321 A2 | 4/1998 | .......... H04N/7/088 |
| EP | 0 837 599 A2 | 4/1998 | ............ H04N/5/00 |
| WO | WO 96/41472 | 12/1996 | ............ H04N/7/10 |
| WO | WO 97/46943 | 12/1997 | ........... G06F/13/00 |
| WO | WO 97/47106 | 12/1997 | ............. H04L/9/00 |
| WO | WO 97/47143 | 12/1997 | |
| WO | WO 98/01825 | 1/1998 | ............. G06T/5/00 |
| WO | WO 98/17064 | 4/1998 | .......... H04N/7/173 |
| WO | WO 98/23059 | 5/1998 | |

OTHER PUBLICATIONS

Baker et al., "A Framework for Interactive Television Based on Internet Standards".

* cited by examiner

*Primary Examiner*—Victor R. Kostak
(74) *Attorney, Agent, or Firm*—Fish & Neave

(57) ABSTRACT

An interactive television program guide is provided. Program guide display elements are arranged and styled using markup language documents. These markup language documents may also indicate and select program guide functions. The program guide interprets the markup language documents and generates the display screens and program guide functionality without user intervention. The program guide may also be updated by supplying new markup language documents that modify display screens and program guide functionality. The markup language documents may be supplied by a main facility or a television distribution facility.

33 Claims, 12 Drawing Sheets

150

| CHANNEL | 10:00 PM | 10:30 PM | 11:00 PM |
|---|---|---|---|
| 46 PUBLIC TELEVISION | THE DESERTS OF AFRICA | WILDLIFE | |
| 47 HBO | GHOST | TITANIC | |
| 48 VH-1 | BLUES BROTHERS | | |
| 49 ADU | PPV 1 | PPV 2 | PPV 3 |
| 50 WPTU | COOKING | | |

*FIG. 4*

PROGRAMMING 9:30-10:30 PM

170

MOVIES

| | | |
|---|---|---|
| GHOST | CHANNEL 47 (HBO) | 9:30 - 10:00 |
| TERMINATOR | CHANNEL 7 (PPV) | 8:00 - 10:00 |
| THE BIG RED ONE  171 | CHANNEL 2 (CBS) | 8:30 - 10:30 |
| THE BLUES BROTHERS | CHANNEL 48 (VH-1) | 10:00 - 11:30 |
| TITANIC | CHANNEL 47 (HBO) | 10:00 - 1:30 |
| WHEN HARRY MET SALLY | CHANNEL 4 (NBC) | 9:00 - 11:00 |

SPORTING EVENTS

| | | |
|---|---|---|
| NEW YORK GIANTS | CHANNEL 8 (WXBR) | 8:00 - 10:00 |
| YANKEE BASEBALL | CHANNEL 11 (WLIW) | 8:00 - 11:00 |

NEWS

| | | |
|---|---|---|
| LOCAL NEWS | CHANNEL 17 (WLIR) | 9:30 - 10:00 |
| NEWS EXTRA | CHANNEL 5 (FOX) | 10:00 - 10:30 |

ADULT

| | | |
|---|---|---|
| PAY-PER-VIEW #1 | CHANNEL 49 (ADU) | 10:00 - 10:30 |
| PAY-PER-VIEW #2 | CHANNEL 49 (ADU) | 10:30 - 11:00 |

FIG. 5

ELECTRONIC PROGRAM GUIDE USING MARKUP LANGUAGE

This application claims the benefit of U.S. provisional patent application No. 60/091,975, filed Jul. 7, 1998.

BACKGROUND OF THE INVENTION

This invention relates to video systems, and more particularly, to interactive television program guide systems which provide for the flexible modification of program guide user screen layouts and program guide functionality.

Cable, satellite, and broadcast television systems provide viewers with a large number of television channels. Users have traditionally consulted printed television program schedules to determine the programs being broadcast at a particular time. More recently, interactive electronic television program guides have been developed that allow television program information to be displayed on a user's television.

Interactive program guides allow the user to navigate through television program listings using a remote control. In a typical program guide display, television listings are organized and displayed in subsets according to multiple selection criteria and are sorted in various ways. For example, one approach is to organize program listings into a grid.

With current interactive program guides, user screens (e.g., screens containing program listings) and program guide functionality are fixed. It is generally not possible to change user screens or program guide functionality without downloading an entire new program guide application.

Accordingly, it would be desirable if a markup language could be used to provide for downloading display characteristics of user screens and program guide functionality as plug-ins anytime, without modifying the code of the application.

It is therefore an object of the present invention to provide an interactive television program guide that arranges program guide display elements using a markup language.

It is also an object of the present invention to provide an interactive television program guide that indicates and selects program guide functionality using a markup language.

It is also an object of the present invention to provide an interactive television program guide that may be updated by downloading markup language documents without user intervention.

SUMMARY OF THE INVENTION

This and other objects of the invention are accomplished in accordance with the principles of the present invention by providing an interactive program guide system that has program guide display screen look and functionality assigned or updated using markup language documents.

Program guide data is provided by a data source in a satellite uplink facility. This information is transmitted to a television distribution facility such as a cable headend via a satellite link. The television distribution facility distributes the information (and television programming signals) to user television equipment on which an interactive television program guide is implemented. One suitable distribution scheme involves transmitting television channels and distributing the information for program listings in the vertical blanking interval of one of the channels or in a sideband. Alternatively, the information for program listings may be provided on a television channel sideband, using an in-band digital channel, using an out-of-band digital signal, or by any other suitable data transmission technique.

The user television equipment for receiving and processing the television program listings and program listings information may include a set-top box. The set-top box is also able to receive the television programming distributed by the television distribution facility. The program guide implemented on the set-top box processes television program listings information and generates display screens (e.g., an interactive television program guide grid) for display, e.g., on a standard television monitor.

Program guide display elements may have a set of associated attributes. Display element attributes may include display element style and layout information (e.g., font size, font type, color, screen coordinates, etc.), actions associated with the display element, or any other suitable attribute. Display element actions may be indicated and selected using the markup language documents. The markup language used may be any suitable markup language or system of marking up, or tagging, a document (e.g., text file) so that the document indicates user display screen layout and styling and program guide functionality. For example, the markup language document may contain HyperText Markup Language (HTML), Dynamic HyperText Markup language (DHTML), or Extensible Markup Language (XML) code. The program guide is programmed to interpret the markup language documents and generate the display screens and provide program guide functionality according to the documents.

The use of a markup language provides an interactive television program guide in which display screens may be modified by downloading markup language documents without user intervention and without modifying the code of the application. Application functionality may be modified by attaching documents to the different modules in the same manner. The use of a markup language also allows a control entity to control some of the appearance and functionality of the guide and to create enhanced features and promotions based on designing a screen layout with off-the-shelf markup language editors and/or viewers.

Further features of the invention, its nature and various advantages will be more apparent from the accompanying drawings and the following detailed description of the preferred embodiments.

BRIEF DESCRIPTION OF THE DRAWINGS

FIG. 4 is an illustrative program listings grid in accordance with the principles of the present invention.

FIG. 5 is an illustrative program listings list in accordance with the principles of the present invention.

DETAILED DESCRIPTION OF THE PREFERRED EMBODIMENTS

Figure 1:
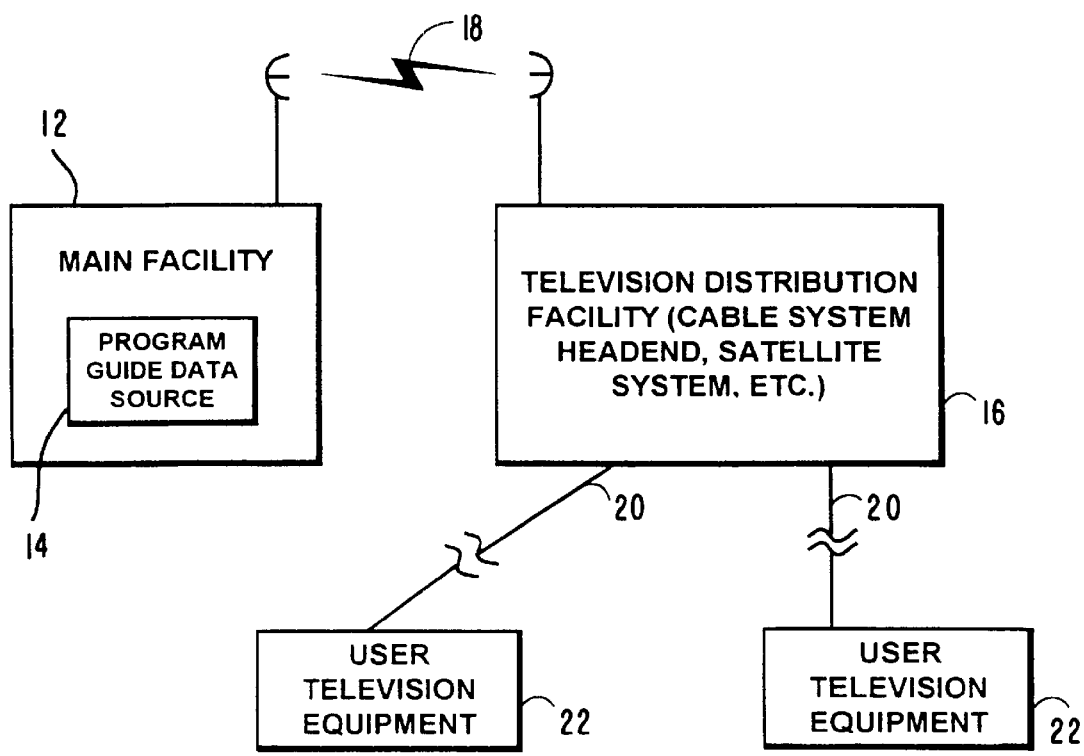
FIG. 1 is a schematic block diagram of a system in accordance with the principles of the present invention.

An illustrative system 10 in accordance with the present invention is shown in FIG. 1. Main facility 12 provides data from program guide data source 14 to television distribution facility 16 via communications link 18. There are preferably numerous television distribution facilities 16, although only one such facility is shown in FIG. 1 to avoid overcomplicating the drawing. Link 18 may be a satellite link, a telephone network link, a cable or fiber optic link, a microwave link, a combination such links, or any other suitable communications path. If it is desired to transmit video signals over link 18 in addition to data signals, a relatively high bandwidth link such as a satellite link may generally be preferred to a relatively low bandwidth link such as a telephone line. Television distribution facility 16 may be any appropriate distribution facility, such as a cable system headend, a broadcast distribution facility, or a satellite television distribution facility.

The program guide data transmitted by main facility 12 to television distribution facility 16 includes television program listings data (e.g., program times, channels, titles, and descriptions) and other program listings information for additional services other than television program listings (e.g., weather information, associated Internet web links, computer software, etc.). It may also contain markup language documents such as HyperText Markup Language (HTML), Dynamic HyperText Markup Language (DHTML), or Extensible Markup Language (XML) documents, for updating the display screen layouts and functionality of a program guide without user intervention.

The markup language documents may include the code of any suitable markup language or system of marking up, or tagging, a document (e.g., text file) so that the document arranges user display screen layout and styling and indicates program guide functionality. For example, the markup language document may contain HTML, DHTML, or XML code. The program guide is programmed to interpret the markup language documents and generate the display screens and provide program guide functionality according to the documents.

Television distribution facility 16 distributes the television program listings, additional data, and markup language documents to multiple users via communications paths 20. Each user has user television equipment 22 for displaying the television program listings information using an interactive television program guide. Communication paths 20 preferably have sufficient bandwidth to allow television distribution facility 16 to distribute television programming to user television equipment 22. If desired, television programming may be provided over separate communications paths (not shown).

Program guide data may be distributed to user television equipment 22 using any suitable scheme. For example, program guide data may be provided in a continuous stream or may be transmitted at a suitable time interval (e.g., once per hour). If transmitted continuously, it may not be necessary to store the data locally at user television equipment 22. Rather, user television equipment 22 may extract data "on the fly" as it is needed. If desired, television distribution facility 16 may poll user equipment 22 periodically for certain information (e.g., pay program account information or information regarding programs that have been purchased and viewed using locally-generated authorization techniques).

For clarity the present invention will be illustrated in connection with a system arrangement in which program guide data is distributed from a main facility to an interactive television program guide implemented on user television equipment, via a television distribution facility. Other suitable systems involve systems in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility and user television equipment acts as a client processor.

Figure 2:
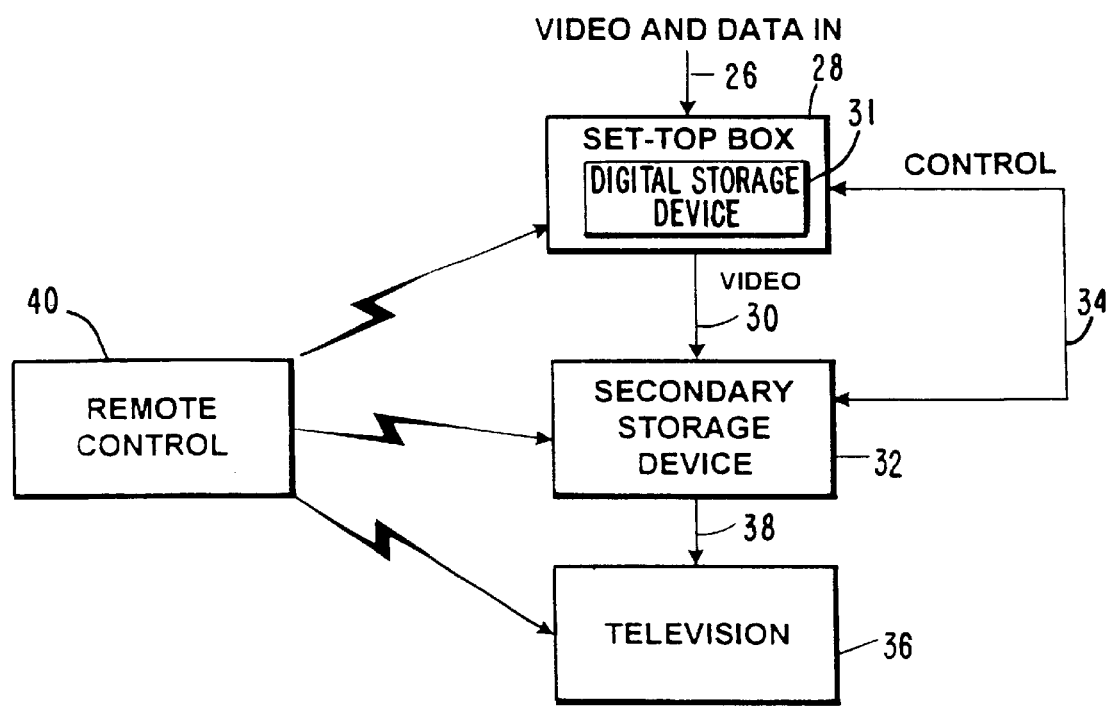
FIG. 2 is a schematic block diagram of illustrative user television equipment in accordance with the principles of the present invention.

An illustrative arrangement for user television equipment 22 is shown in FIG. 2. User television equipment 22 of FIG. 2 receives video and data from television distribution facility 16 (FIG. 1) at input 26. During normal television viewing, the user tunes set-top box 28 to a desired television channel. The signal for that television channel is then provided at video output 30. The outputted signal is typically either a radio-frequency (RF) signal on a predefined channel (e.g., channel 3 or 4), or a demodulated video signal, but may also be a digital signal provided to television 36 on an appropriate digital bus (e.g., a bus using the IEEE 1394 standard, (not shown)). The video signal at output 30 is received by optional secondary storage device 32.

Optional secondary storage device 32 can be any suitable type of analog or digital program storage device (e.g., a videocassette recorder, a digital video disc (DVD) player with the ability to record DVD discs, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

The interactive television program guide may run on set-top box 28, on television 36 (if television 36 has suitable processing circuitry and memory), or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998 which is hereby incorporated by reference herein in its entirety.

The user may record programs and program data in digital form on optional digital storage device 31. Digital storage device 31 may be a writable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Motion Pictures Expert Group (MPEG) MPEG-2 standard.

The resulting data is streamed to digital storage device 31 via an appropriate bus (e.g., a bus using the IEEE 1394 standard), and is stored on digital storage device 31.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a prerecorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which the user has tuned with set-top box 28. The video signals provided to television 36 may also be provided by set-top box 28 when set-top box 28 is used to play back information stored on digital storage device 31.

Figure 3:
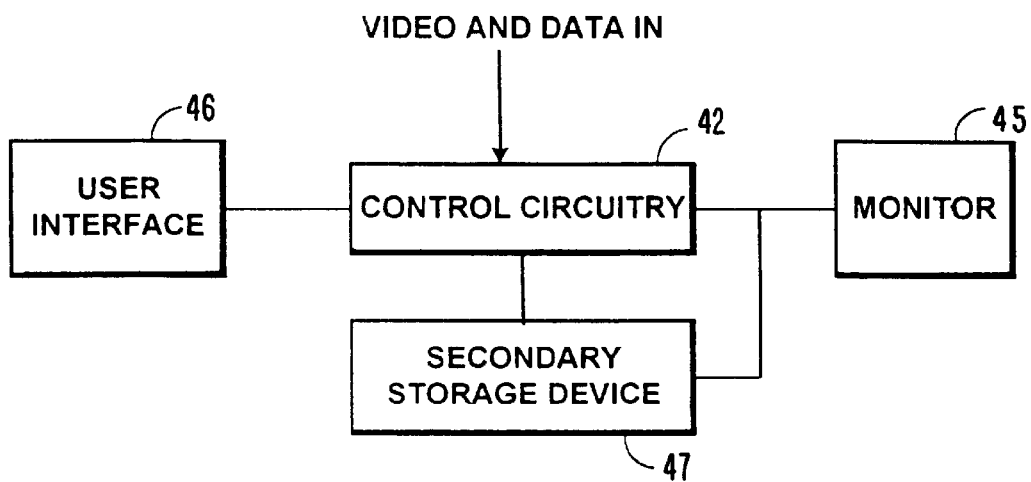
FIG. 3 is a generalized schematic block diagram of portions of the illustrative television equipment of FIG. 2.

A more generalized embodiment of user television equipment 22 (FIG. 2) is shown in FIG. 3. As shown in FIG. 3, control circuitry 42 of user television equipment 22 receives the program guide data, programming, and markup language documents from television distribution facility 16 (FIG. 1). Video signals are typically provided on multiple television channels. The program guide data and markup language documents may be provided on a television channel sideband, in the vertical blanking interval of a television channel, using an in-band digital channel, using an out-of-band digital signal, or by any other suitable data transmission technique.

Control circuitry 42 may be configured to interpret the markup language documents and to generate program guide display screens for display on monitor 45. The program guide display screens may be generated with display elements at positions and with styles that are indicated by the markup language documents. In addition, actions assigned to display elements by the markup language documents may be selected by control circuitry 42 to provide program guide functionality. The functions of control circuitry 42 may be provided using the set-top box arrangement of FIG. 2. Alternatively, these functions may be integrated into an advanced television receiver, personal computer television (PC/TV), or any other suitable arrangement. If desired, a combination of such arrangements may be used. In client-server based program guides, for example, control circuitry 42 may be contained in suitable equipment at television distribution facility 16.

The user controls the operation of user television equipment 22 with user interface 46. User interface 46 may be a pointing device, wireless remote control, keyboard, touchpad, voice recognition system, or any other suitable user input device. To watch television, the user instructs control circuitry 42 to display a desired television channel on monitor 45. To access the features of the program guide, the user instructs the program guide implemented on user television equipment 22 to generate a main menu or a desired program guide display screen for display on monitor 45.

When a user indicates a desire to view television programming information (e.g., by using a "guide" key on remote control 40), the program guide generates an appropriate program guide display screen, such as a program listings screen, for display on monitor 45. A program listings screen may contain one or more lists of programs organized according to multiple organization criteria (e.g., by program type, theme, or any other pre-defined or user defined and selectable criteria) and sorted in various ways (e.g., alphabetically). The program listings screen may be overlaid over a program being viewed by the user or overlaid over a portion of the program in a "browse" mode.

One approach is to organize program listings into a program listings grid. FIG. 4 illustrates the display of program listings in program listings grid 150. Program listings grid 150 may be divided into a number of columns 162 which correspond to program broadcast times and which may be equally spaced apart (e.g., in thirty-minute steps). Program listings may be displayed in the grid in sub-sets according to multiple selectable organization criteria and sorted in various ways. Program listings row 152 contains, for example, selectable program listings for THE DESERTS OF AFRICA and WILDLIFE on channel 46 (Public Television). Program listings row 154 contains, for example, selectable program listings for GHOST and TITANIC on channel 47 (HBO). Program listings row 156 contains, for example, selectable program listings for programs BLUES BROTHERS on channel 48 (VH-1). Program listing row 158 contains selectable program listings for programs, PPV 1, and PPV 2 on channel 49 (ADU). Program listings row 160 contains a selectable program listing for COOKING on channel 50 (WPTU). The programs on each channel are typically different. Program listings grid 150 may have movable cell highlight region 151, which highlights the current grid cell. The user may position highlight region 151 by entering appropriate commands with user interface device 46. For example, if user input interface device 46 has a keypad, the user can position highlight region 151 using "up," "down," "left," and "right" cursor keys. Remote program listings may also be panned left, right, up, and down by positioning highlight region 151 using the cursor keys on remote control 40. Alternatively, a touch sensitive screen, trackball, voice commands, or other suitable device may be used to move highlight region 151 or to select program listings without the use of highlight region 151. In still another approach, the user may speak a television program listing into a voice request recognition system. Any other suitable approach may be used.

After a user selects a program listing, the interactive program guide may provide the user with the opportunity to access a number of program guide features. For example, the user may access additional information (typically text or graphics, but possibly video and other information) about the listing, set a reminder, schedule an associated program for recording, set parental control features, set and navigate through favorite channels, or any other suitable program guide feature.

Program listings may also be displayed for the user in a list. FIG. 5 illustrates a program listings display screen having a program listings list displayed in accordance with the principles of the present invention. Scrollable program listings lists may display program listings in subsets according to user-selected organization criteria. Any suitable organization criteria and sorting scheme may be used. Scrollable program listings list 170 of FIG. 5, for example, organizes program listings according to program type and then sorts the listings alphabetically in each sub-set. The television program listings display screen of FIG. 5 also has movable cell highlight region 171 for moving within the list and selecting listings.

Program guide display screens may display a number of display elements such as program listings grid 150, program listings list 170, or any other suitable display element. Display elements may be arranged or styled using the markup language documents. Program guide functions may be indicated and selected using the markup language documents. Preferably, the markup language used is a standardized and widely accepted markup language, such as HTML, DHTML, or XML. The program guide is also programmed to interpret the markup language documents. The program guide is programmed to generate display screens and select program guide functionality according to the markup language documents.

Display screen style and layout and program guide functionality may be set initially for the program guide and later modified by the markup language documents supplied by main facility 12 (FIG. 1) to the interactive television program guide. In practice, when the program guide is going to be updated with a new markup language document an operator at a main facility, television distribution facility, or other interested facility generates a desirable markup language document using any suitable word processor or markup language document editor. The markup language document may be provided to the interactive program guide manually or automatically (e.g., at a predefined time). The markup language document is provided to, stored by, and interpreted by the interactive program guide without the intervention of the user. This provides for allowing an operator to centrally update the display characteristic and functionality of the program guide without user intervention.

Display elements are defined using a non-markup language approach and are preprogrammed into the program guide. Display elements may, for example, be programmed into the interactive program guide using any suitable programming language (e.g. Visual BASIC, C++, etc.). The markup language documents may organize display element attributes (e.g., style, layout, and action attributes) into finite sets of display element attributes which may be a subset of the attributes actually programmed into the program guide. The sets of display element attributes may be assigned to the display elements using indicators, or tags. The tags may indicate where to place the defined display elements on the program guide display screen. The tags may also indicate styles to be applied to the display elements. Preferably, the display elements are programmed to render themselves to the program guide display screen at the position and with the style defined in the markup language document. The defined display elements may include any suitable program guide display screen element, such as advertisement elements, program listings grid elements, video window elements, text window elements, or any other suitable display screen or standard markup language element.

Program guide functions are defined using a non-markup language approach and are preprogrammed into the program guide. Functions may, for example, be programmed into the program guide using any suitable programming language (e.g. Visual BASIC, C++, etc.). Program guide functionality may be apparent to the user through display element actions, or may be transparent. Any suitable display element action may be assigned and selected using markup language documents. For example, one action may be to replace a partial screen program listings grid (e.g., grid 150) with a full-screen program listings grid in response to a suitable user command. Another action may cause the grid to scroll, page, change its display (e.g., display listings by theme instead of channel, display listings in a list instead of in a grid), start a program search or action list, or perform any other suitable action in response to a suitable user command. The user selection of a program listing in the grid may, for example, cause the program guide to display a program listings information screen, start a recording, set a reminder, or perform other suitable actions.

When markup language documents are supplied to the interactive television program guide, the program guide interprets the documents and generates or modifies the appropriate program guide display screens and program guide functionality according to the documents without intervention by the user. The display characteristics of the display screens may be changed without the need for updating application code, and may be completed in real time and without ever involving the user in the update process.

Figure 6A:
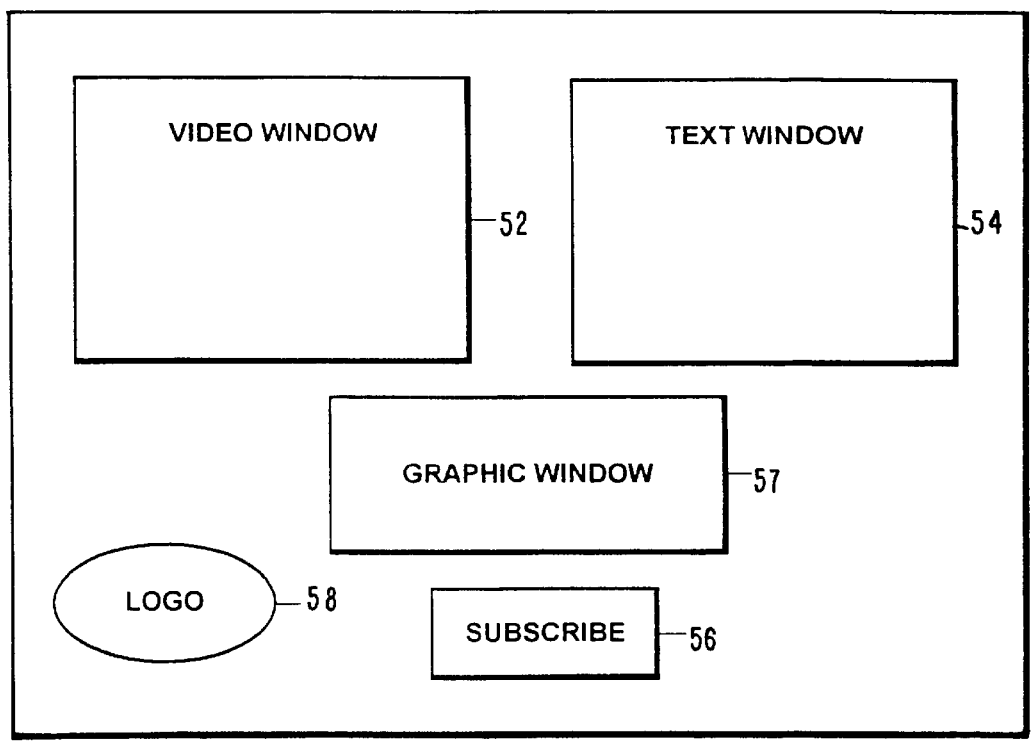
FIGS. 6a and 6b are illustrative display screens in accordance with the principles of the present invention.

FIG. 6a illustrates how a display screen, screen 50, may look after the program guide has been programmed with a markup language document, has interpreted it, and has generated the display screen and selected program guide functionality. Screen 50 may contain a number of display elements. For example, screen 50 may contain video window 52 and text window 54 for displaying promotional videos and information regarding the program being promoted (e.g., subscription price), respectively. Screen 50 may also have graphic window 57 for displaying a program listings grid, such as program listings grid 150 (FIG. 4), or a program listings list, such as program listings list 170 (FIG. 5), or other graphic.

Screen 50 may also contain other display elements, such as on-screen options, or "buttons", which allow the user to access some feature of the program guide. For example, the user may "press" subscribe button 56 by entering appropriate commands on user interface 46 (FIG. 3). By pressing subscribe button 56 the program guide may allow the user to subscribe to the program being promoted. Screen 50 may also include a picture of the local service provider's logo, such as logo area 58.

The layout of screen 50 may become undesirable over time. For example, it may be decided that having a bigger video area and a smaller text area would be more attractive to the user. It may also be desirable to add additional features to the display screen, such as providing a "next" and "previous" button to allow users to scroll through promotional videos at their own pace. It may also be desirable to update the logo of the service provider.

Figure 6B:
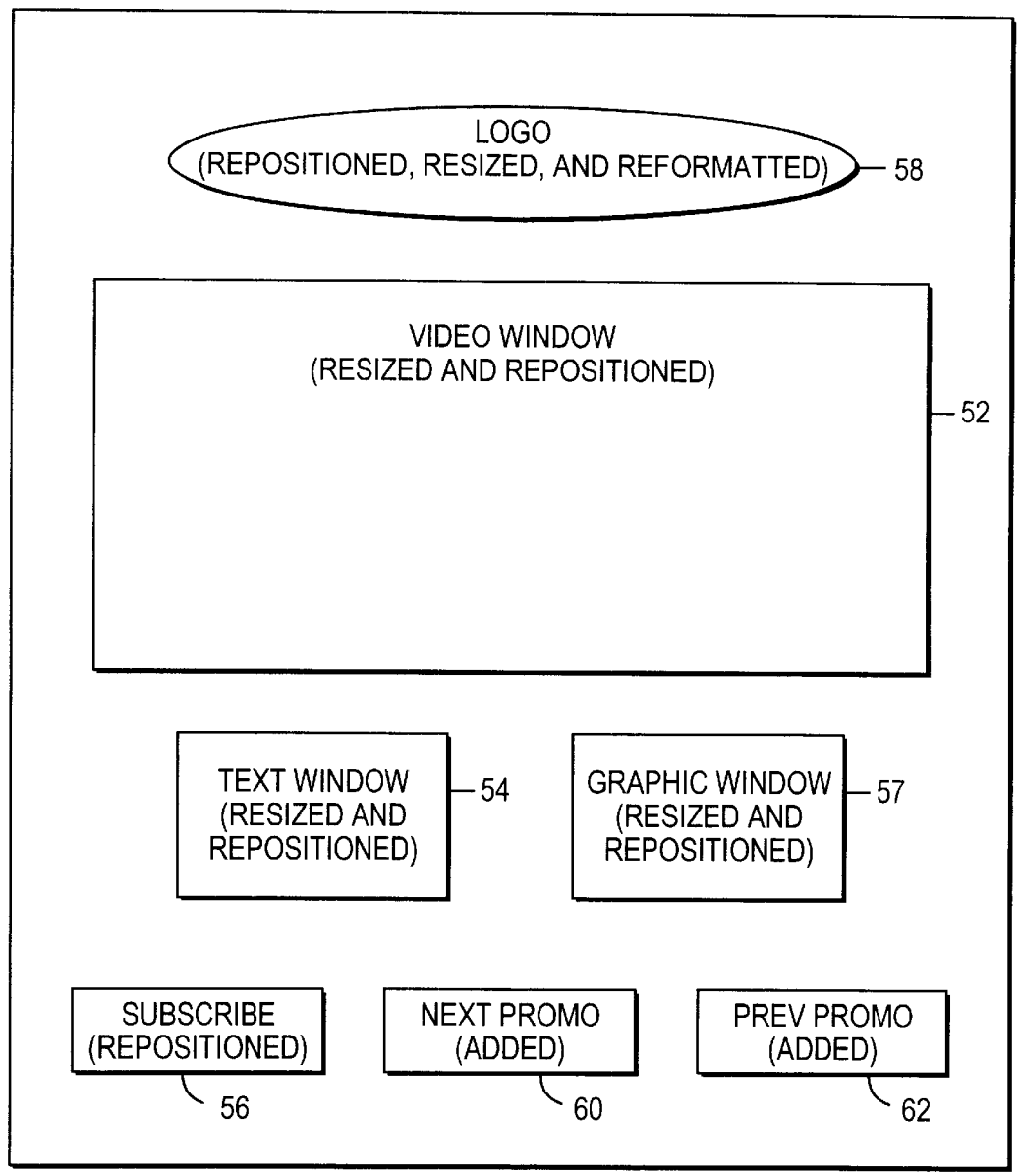

FIG. 6b illustrates how the display screen characteristics of screen 50 may be changed after the program guide has been supplied with a new markup language document from main facility 12 or television distribution facility 16 (FIG. 1) and has interpreted the document and regenerated screen 50. After screen 50 is regenerated by the program guide, video window 52, text window 54, and graphic window 57 may have been resized and repositioned accordingly. In addition if graphic window 57 contains a program listings grid, for example, the number of rows or columns of the grid may be changed, the start time of the grid adjusted, or any other suitable change to the grid made. Logo area 58 may have been resized and repositioned. Logo area 58 may also have been reformatted or styled by, for example, changing the style of text used, changing the colors of the logo, or by adding any other type of special effect. Next button 60 and previous button 62 may have been added.

Figure 7A:
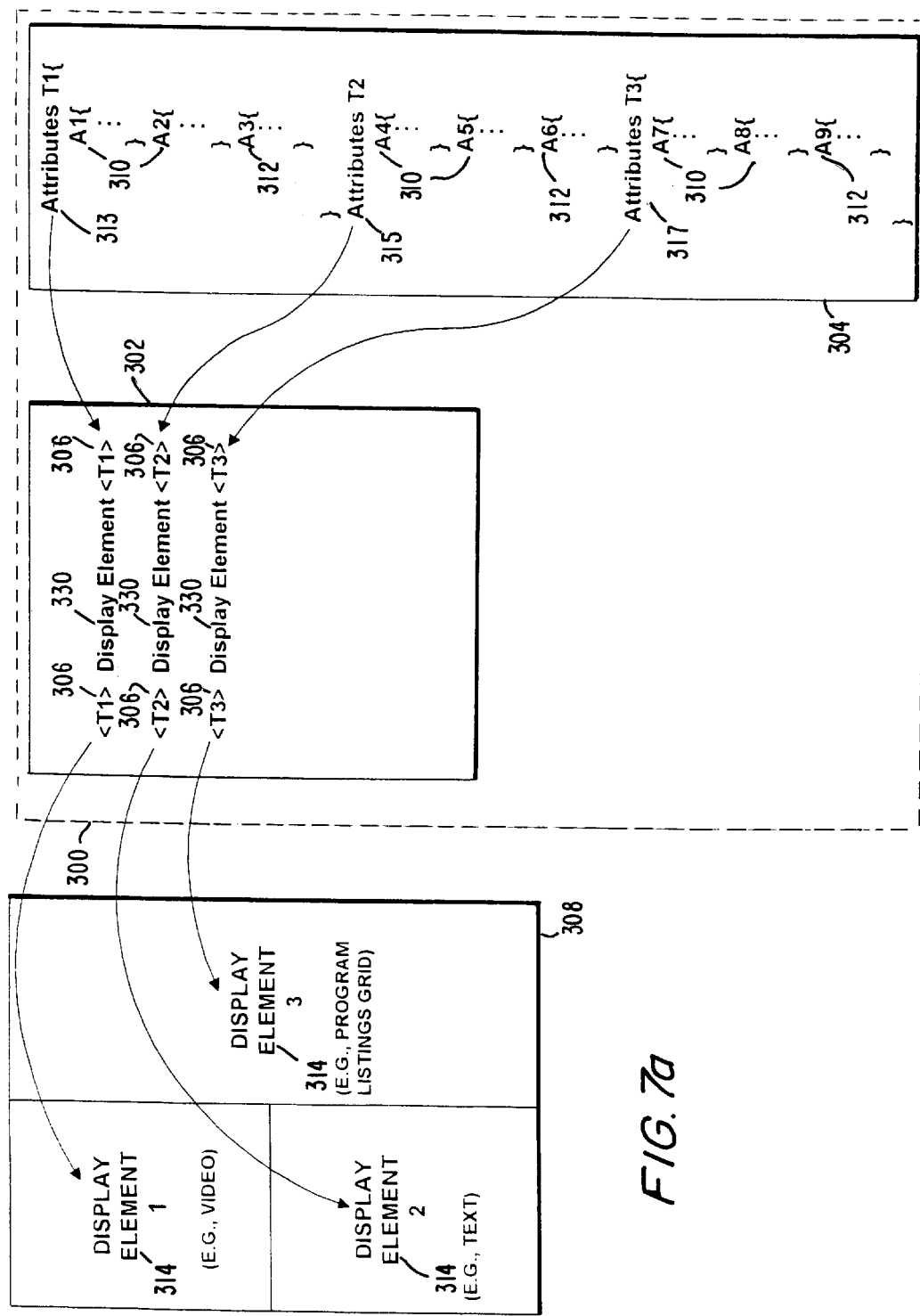
FIGS. 7a–7b illustrate how different markup language documents may be used to arrange and style display elements and indicate and select program guide functionality.

FIG. 7a illustrates how markup language documents may be used initially to arrange and style display elements and to indicate and select program guide functionality using a markup language document that is initially supplied to the program guide. Any suitable markup language or approach may be used. In practice, the markup language documents may be continuous, from top to bottom and the attributes of display elements may immediately follow below a display element tag. Markup language document 300 has been illustrated, however, having left and right portions 302 and 304 to more clearly illustrate the principles of the present invention. Portion 302 of markup language document 300 illustrates how display element identifier 330 may be tagged by tags 306. Portion 304 of markup language document 300 illustrates how display element attributes may be organized into sets using markup language documents and assigned using the tags.

As shown in FIG. 7a, display element attributes 310 and 312 may be organized into sets 313, 315, and 317. Each display element may be assigned a set of attributes. Markup language document 300 may tag display element identifiers 330 using tags 306. Tags 306 are generically labeled T1, T2, and T3 to indicate which display element is being tagged (display element 1, display element 2, and display element 3, respectively). Tags 306 have associated attributes 310 (e.g., A1, A2, A4, A5, A7, and A8) from the sets that may indicate, for example, where on the display screen the display elements will be placed, their size, and how they will be styled (e.g., color, font special effects, etc.). To generate a display screen such as screen 308, the interactive program guide may parse the markup language document, extract the style and layout information, and generate a display screen accordingly.

FIG. 7a also illustrates how program guide functionality may be indicated and selected using markup language document 300. The program guide may have been preprogrammed with a large number of actions. Portion 304 of markup language document 300 may be used to select from those actions the actions that are suitable for a particular display element. Attributes 312 may be included in the finite sets of attributes 313, 315, and 317 to indicate the selected actions. While a display element may have multiple associated actions (e.g., a menu), only one attribute 312 has been shown for each set to avoid overcomplicating the drawing. The actions may be assigned to display elements 314 as indicated in FIG. 7a using tags 306.

Figure 7B:
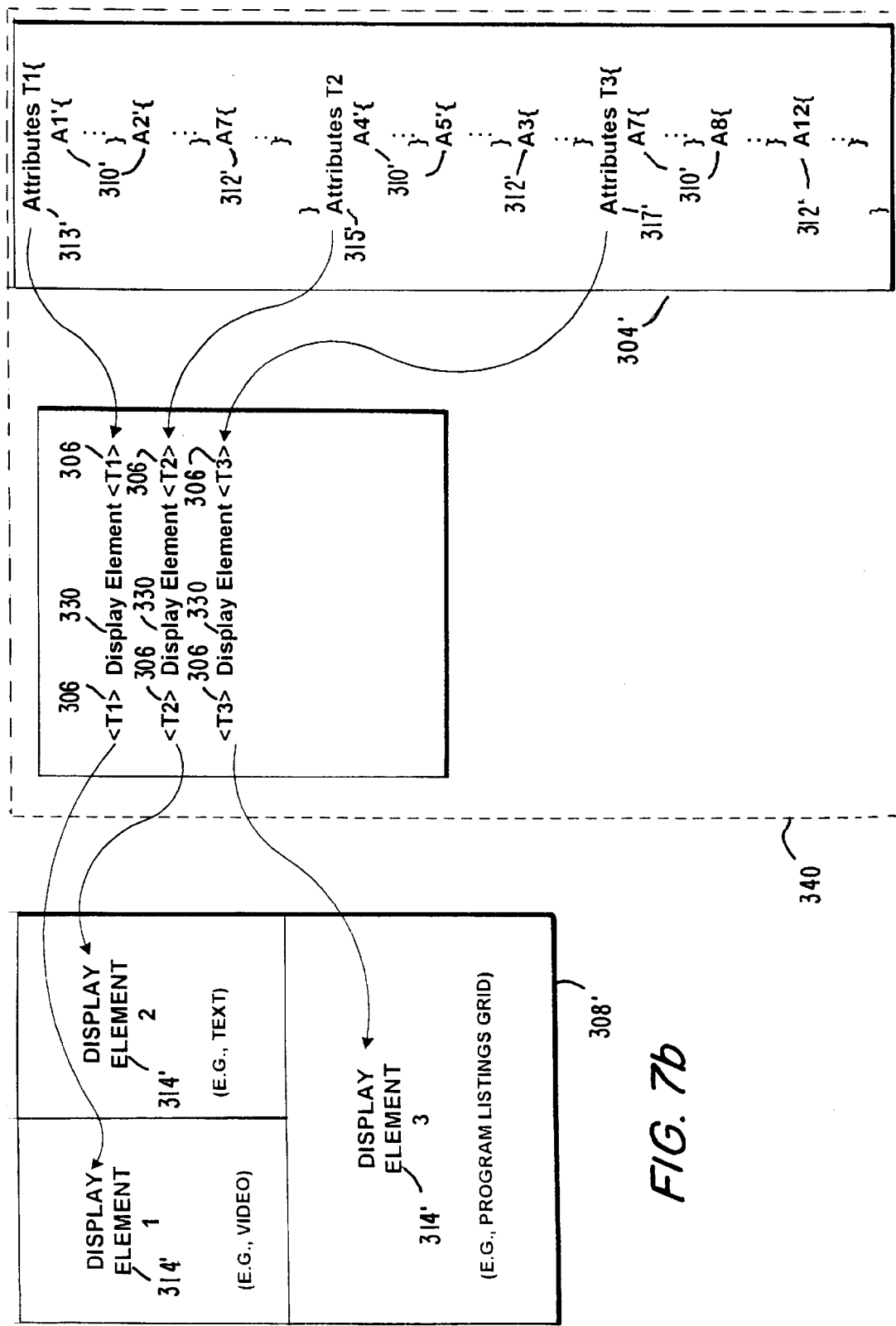

FIG. 7b illustrates how the display characteristics of display screen 308 may be changed or modified by rearranging and restyling display elements 314 using a different markup language document, such as markup language document 340. As shown, markup language document 340 may use tags 306 to assign sets of attributes to the display elements. When the interactive program guide interprets and parses markup language document 340, it obtains the new or changed attributes 310' from the sets and uses tags 306 to generate, for example, display screen 308' with display elements 314'. As illustrated when display screen 308' is compared with display screen 308 of FIG. 7a, display elements 314 may be resized, repositioned, and restyled (not shown). Thus, a first markup language document (300) may be used by the interactive program guide to generate a first display screen 308, and a second markup language document (340) may be used to modify the display screen (308') (e.g., reposition, resize, and restyle display elements 314), thereby generating a second display screen with display characteristics different from the first.

FIG. 7b also illustrates how different actions for the display elements may be assigned and selected using markup language documents. Different actions may be included in the sets as illustrated when comparing sets 313, 315, and 317 of FIG. 7a with sets 313', 315', and 317' of FIG. 7c. New actions may be indicated and previously indicated actions dropped, as illustrated by set 317' and 315', (e.g., A12 and A6). In addition, the actions may be selected for different display elements as shown in set 313' (e.g., A7 was moved from set 317 of FIG. 7a to set 313' of FIG. 7b).

Figure 8:
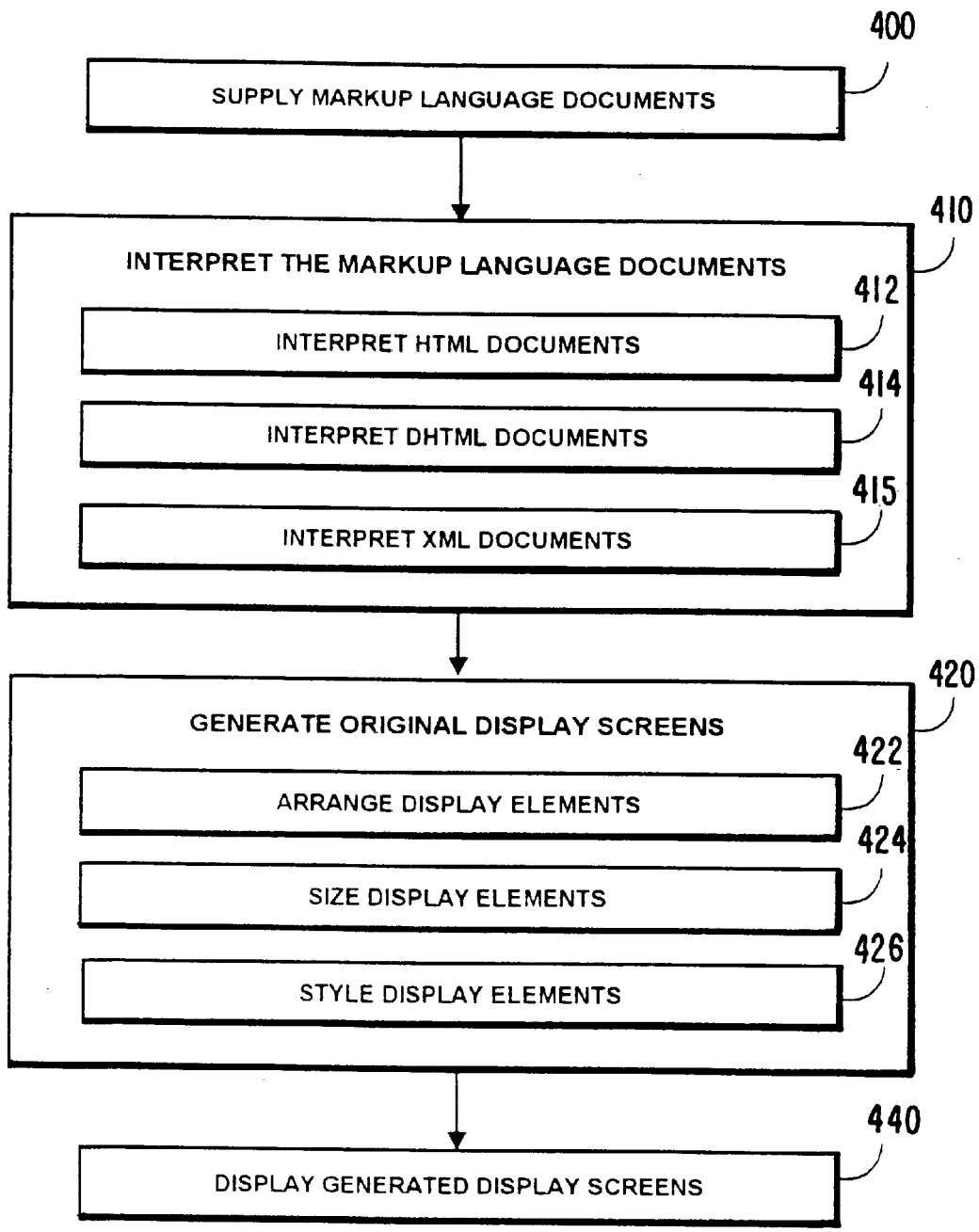
FIGS. 8–10 are flow charts of steps involved in the operation of the present invention.
Figure 9:
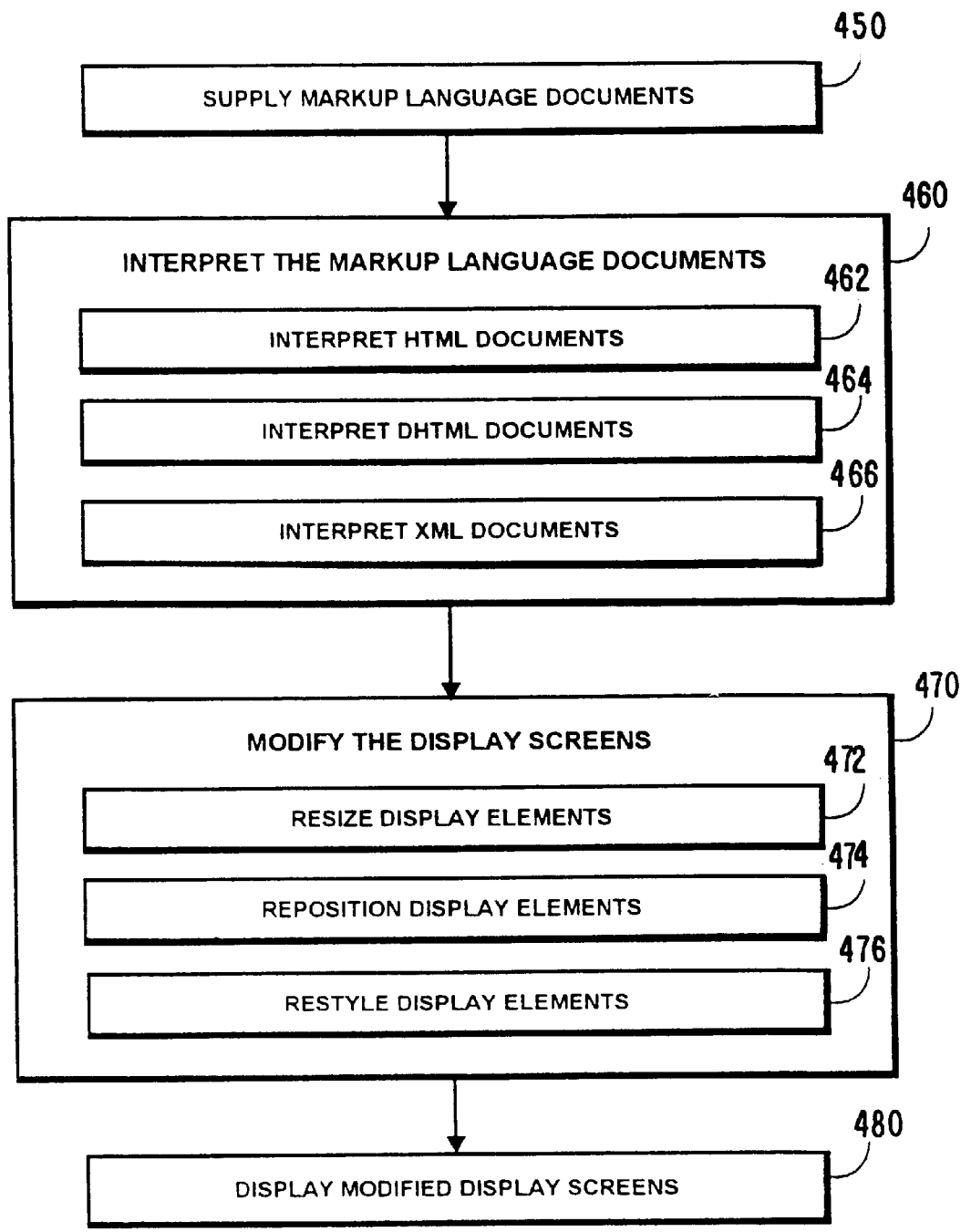
Figure 10:
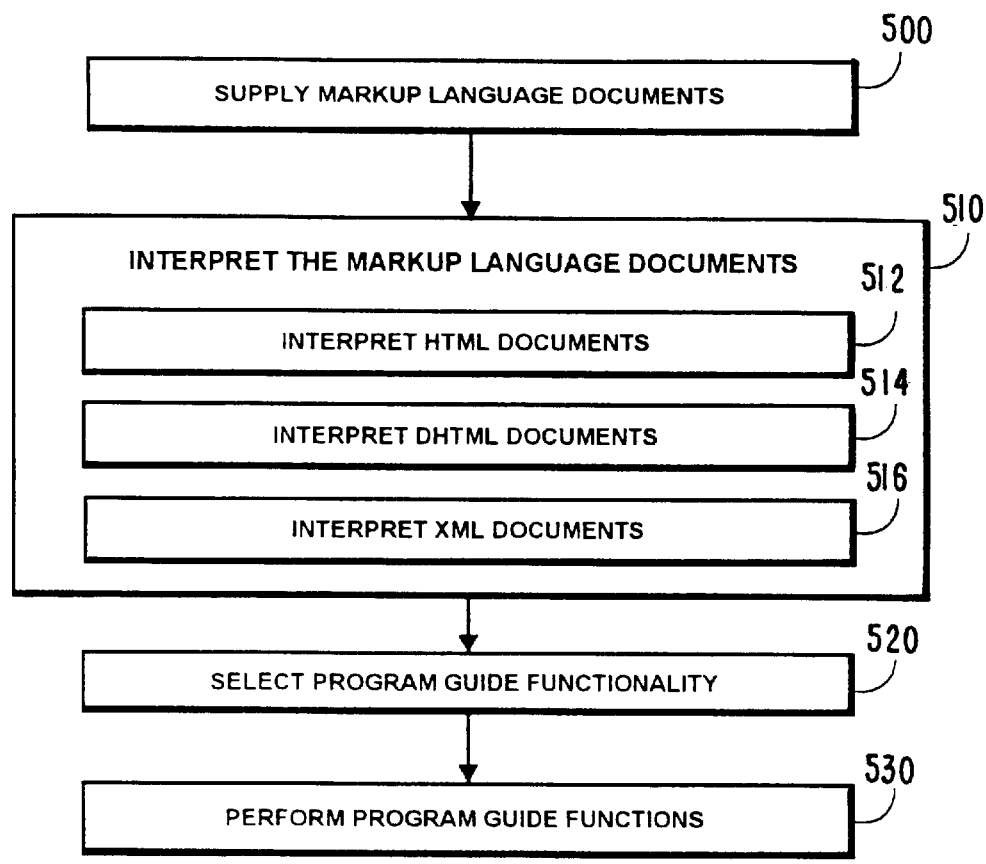

Steps involved in operating the program guide of the present invention are set forth in FIGS. 8–10. FIG. 8 illustrates steps involved in generating display screens. At step 400, the program guide is supplied with markup language documents which arrange and style the display elements as part of the initial programming of the program guide. The documents are preferably of a widely accepted and standardized markup language, such as HTML, DHTML, XML, or any other suitable markup language. At step 410, the program guide interprets the markup language documents. Particular types of markup language documents may be interpreted at substeps 412, 414 and 415, respectively. The display screens are generated according to the markup language documents at step 420. This may include substeps 422, 424, and 426, in which the display elements are arranged, sized, and styled, respectively. At step 440, the program guide displays the display screens according to the markup language documents.

FIG. 9 illustrates steps involved in modifying program guide display screens. At step 450, the program guide is supplied with markup language documents which may resize, reposition, or restyle the display elements. The documents are preferably of a widely accepted and standardized markup language, such as HTML, DHTML, XML, or any other suitable markup language. At step 460, the program guide interprets the markup language documents. Particular types of markup language documents may be interpreted at substeps 462, 464, and 466 respectively. The display screens are modified at step 470. This may include substeps 472, 474, and 476, in which the display elements are resized, repositioned, and restyled respectively. At step 480, the program guide displays the display screens according to the markup language documents.

FIG. 10 illustrates steps involved in assigning and selecting program guide functionality. The program guide functionality indicated and selected may be apparent or hidden to the user. At step 500, the program guide is supplied with markup language documents which assign program guide functionality to display items. The documents may be supplied as part of the initial programming of the program guide, or may be supplied by a main facility or television distribution facility when the program guide is updated. The documents are preferably of a widely accepted and standardized markup language, such as HTML, DHTML, or XML. At step 510, the program guide interprets the markup language documents. As shown, HTML, DHTML, or XML markup language documents may be interpreted at substeps 512, 514, and 516, respectively. Program guide functionality is selected for the display elements at step 520 according to the markup language documents. At step 540, the program guide performs the selected functions.

The foregoing is merely illustrative of the principles of this invention and various modifications can be made by those skilled in the art without departing from the scope and spirit of the invention.

What is claimed is:

1. A system for allowing an operator to update the display characteristics of interactive television program guide display screens that are generated by an interactive television program guide for display on a user's user television equipment, wherein television programming is displayed on the user television equipment and television program listings information is displayed on the user television equipment in a program guide display screen having at least one display element that is preprogrammed into the interactive television program guide, the system comprising:

means for allowing the operator to supply a first markup language document to the interactive television program guide without intervention by the user, wherein the first markup language document indicates how the preprogrammed display element is to be displayed by the interactive television program guide on the user television equipment;

means for interpreting the first markup language document using the interactive program guide; and means for generating and displaying a first program guide display screen containing the preprogrammed display element displayed as indicated by the interpreted first markup language document using the interactive television program guide;

means for allowing the operator to supply a second markup language document to the interactive television program guide without intervention by the user when the operator desires to update the display characteristics of the first interactive program guide display screen, wherein the second markup language document indicates how the preprogrammed display element is to be displayed by the interactive television program guide on the user television equipment;

means for interpreting the second markup language document using the interactive program guide; and means for generating and displaying a second program guide display screen to replace the first program guide display screen, the second program guide display screen containing the preprogrammed display element displayed as indicated by the interpreted second markup language document using the interactive television program guide, wherein the display characteristics of the second program guide display screen are different from the display characteristics of the first program guide display screen.

2. The system defined in claim 1 wherein:

the first markup language document indicates a first position for the preprogrammed display element;

the means for generating and displaying the first program guide display screen comprises means for generating and displaying the first program guide display screen containing the preprogrammed display element at the first position using the interactive television program guide;

the second markup language document indicates a second position for the preprogrammed display element; and the means for generating and displaying the second program guide display screen comprises means for generating and displaying the second program guide display screen containing the preprogrammed display element at the second position using the interactive television program guide.

3. The system defined in claim 1 wherein:

the first markup language document indicates a first size for the preprogrammed display element;

the means for generating and displaying the first program guide display screen comprises means for generating and displaying the first program guide display screen containing the preprogrammed display element with the first size using the interactive television program guide;

the second markup language document indicates a second size for the preprogrammed display element; and the means for generating and displaying the second program guide display screen comprises means for generating and displaying the second program guide display screen containing the preprogrammed display element with the second size using the interactive television program guide.

4. The system defined in claim 1 wherein:

the first markup language document indicates a first style for the preprogrammed display element;

the means for generating and displaying the first program guide display screen comprises means for generating and displaying the first program guide display screen containing the preprogrammed display element with the first style using the interactive television program guide;

the second markup language document indicates a second style for the preprogrammed display element; and the means for generating and displaying the second program guide display screen comprises means for generating and displaying the second program guide display screen containing the preprogrammed display element with the second style using the interactive television program guide.

5. The system defined in claim 1 wherein:

the means for interpreting the first markup language document further comprises means for interpreting HyperText Markup Language documents; and the means for interpreting the second markup language document further comprises means for interpreting HyperText Markup Language documents.

6. The system defined in claim 1 wherein:

the means for interpreting the first markup language document further comprises means for interpreting Dynamic HyperText Markup Language documents; and the means for interpreting the second markup language document further comprises means for interpreting Dynamic HyperText Markup Language documents.

7. The system defined in claim 1 wherein:

the means for interpreting the first markup language documents further comprises means for interpreting Extensble Markup Language documents; and the means for interpreting the second markup language documents further comprises means for interpreting Extensible Markup Language documents.

8. A system for allowing an operator to update the functionality of an interactive television program guide that generates program guide display screens for display on a user's television equipment, wherein television programming is displayed on the user television equipment and television program listings information is displayed on the user television equipment in a program guide display screen having at least one display element having at least one associated action that is preprogrammed into the interactive television program guide, the system comprising:

means for allowing the operator to supply a first markup language document to the interactive television program guide without intervention by the user, wherein the first markup language document assigns a first preprogrammed action to the display element;

means for interpreting the first markup language document using the interactive program guide;

means for generating a program guide display screen containing the display element and selecting the first preprogrammed action for the display element as assigned by the interpreted first markup language document using the interactive television program guide;

means for allowing the operator to supply a second markup language document to the interactive television program guide without intervention by the user when the operator desires to update the functionality of the interactive television program guide, wherein the second markup language document assigns a second preprogrammed action to the display element that is different than the first preprogrammed action;

means for interpreting the second markup language document using the interactive program guide; and means for generating and displaying a program guide display screen containing the display element and selecting the second preprogrammed action for the display element as assigned by the interpreted second markup language document using the interactive television program guide.

9. The system defined in claim 8 wherein:

the means for interpreting the first markup language document further comprises means for interpreting Hyper Text Markup Language documents; and the means for interpreting the second markup language document further comprises means for interpreting Hyper Text Markup Language documents.

10. The system defined in claim 8 wherein:

the means for interpreting the first markup language document further comprises means for interpreting Dynamic HyperText Markup Language documents; and the means for interpreting the second markup language document further comprises means for interpreting Dynamic HyperText Markup Language documents.

11. The system defined in claim 8 wherein:

the means for interpreting the first markup language document further comprises means for interpreting Extensible Markup Language documents; and the means for interpreting the second markup language document further comprises means for interpreting Extensible Markup Language documents.

12. A method for allowing an operator to update the display characteristics of interactive television program guide display screens that are generated by an interactive television program guide for display on a user's user television equipment, wherein television programming is displayed on the user television equipment and television program listings information is displayed on the user television equipment in a program guide display screen having at least one display element that is preprogrammed into the interactive television program guide, the method comprising the steps of:

allowing the operator to supply a first markup language document to the interactive television program guide without intervention by the user, wherein the first markup language document indicates how the preprogrammed display element is to be displayed by the interactive television program guide on the user television equipment;

interpreting the first markup language document using the interactive program guide; and generating and displaying a first program guide display screen containing the preprogrammed display element displayed as indicated by the interpreted first markup language document using the interactive television program guide;

allowing the operator to supply a second markup language document to the interactive television program guide without intervention by the user when the operator desires to update the display characteristics of the first interactive program guide display screen, wherein the second markup language document indicates how the preprogrammed display element is to be displayed by the interactive television program guide on the user television equipment;

interpreting the second markup language document using the interactive program guide; and generating and displaying a second program guide display screen to replace the first program guide display screen, the second program guide display screen containing the preprogrammed display element displayed as indicated by the interpreted second markup language document using the interactive television program guide, wherein the display characteristics of the second program guide display screen are different from the display characteristics of the first program guide display screen.

13. The method defined in claim 12 wherein:

the first markup language document indicates a first position for the preprogrammed display element;

the step of generating and displaying the first program guide display screen comprises the step of generating and displaying the first program guide display screen containing the preprogrammed display element at the first position using the interactive television program guide;

the second markup language document indicates a second position for the preprogrammed display element; and the step of generating and displaying the second program guide display screen comprises the step of generating and displaying the second program guide display screen containing the preprogrammed display element at the second position using the interactive television program guide.

14. The method defined in claim 12 wherein:

the first markup language document indicates a first size for the preprogrammed display element;

the step of generating and displaying the first program guide display screen comprises the step of generating and displaying the first program guide display screen containing the preprogrammed display element with the first size using the interactive television program guide;

the second markup language document indicates a second size for the preprogrammed display element; and the step of generating and displaying the second program guide display screen comprises the step of generating and displaying the second program guide display screen containing the preprogrammed display element with the second size using the interactive television program guide.

15. The method defined in claim 12 wherein:

the first markup language document indicates a first style for the preprogrammed display element;

the step of generating and displaying the first program guide display screen comprises the step of generating and displaying the first program guide display screen containing the preprogrammed display element with the first style using the interactive television program guide;

the second markup language document indicates a second style for the preprogrammed display element; and the step of generating and displaying the second program guide display screen comprises the step of generating and displaying the second program guide display screen containing the preprogrammed display element with the second style using the interactive television program guide.

16. The method defined in claim 12 wherein:

the step of interpreting the first markup language document comprises the step of interpreting HyperText Markup Language documents; and the step of interpreting the second markup language document comprises the step of interpreting HyperText Markup Language documents.

17. The method defined in claim 12 wherein:

the step of for interpreting the first markup language document comprises the step of interpreting Dynamic HyperText Markup Language documents; and the step of interpreting the second markup language document comprises the step of interpreting Dynamic HyperText Markup Language documents.

18. The method defined in claim 12 wherein:

the step of interpreting the first markup language documents comprises the step of interpreting Extensible Markup Language documents; and the step of interpreting the second markup language documents comprises the step of interpreting Extensible Markup Language documents.

19. A method for allowing an operator to update the functionality of an interactive television program guide that generates program guide display screens for display on a user's television equipment, wherein television programming is displayed on the user television equipment and television program listings information is displayed on the user television equipment in a program guide display screen having at least one display element having at least one associated action that is preprogrammed into the interactive television program guide, the method comprising the steps of:

allowing the operator to supply a first markup language document to the interactive television program guide without intervention by the user, wherein the first markup language document assigns a first preprogrammed action to the display element;

interpreting the first markup language document using the interactive program guide;

generating the program guide display screen containing the display element and selecting the first preprogrammed action for the display element as assigned by the interpreted first markup language document using the interactive television program guide;

allowing the operator to supply a second markup language document to the interactive television program guide without intervention by the user when the operator desires to update the functionality of the interactive television program guide, wherein the second markup language document assigns a second preprogrammed action to the display element that is different than the first preprogrammed action;

interpreting the second markup language document using the interactive program guide; and generating and displaying the program guide display screen containing the display element and selecting the second preprogrammed action for the display element as assigned by the interpreted second markup language document.

20. The method defined in claim 19 wherein:

the step of interpreting the first markup language document comprises the step of interpreting Hyper Text Markup Language documents; and interpreting the second markup language document further comprises means for interpreting Hyper Text Markup Language documents.

21. The method defined in claim 19 wherein:

the step of interpreting the first markup language document further comprises the step of interpreting Dynamic HyperText Markup Language documents; and the step of interpreting the second markup language document further comprises the step of interpreting Dynamic HyperText Markup Language documents.

22. The method defined in claim 19 wherein:

the step of interpreting the first markup language document comprises the step of interpreting Extensible Markup Language documents; and the step of interpreting the second markup language document comprises the step of interpreting Extensible Markup Language documents.

23. A system for allowing an operator to update the display characteristics of interactive television program guide display screens that are generated by an interactive television program guide for display on a user's user television equipment, wherein television programming is displayed on the user television equipment and television program listings information is displayed on the user television equipment in a program guide display screen having at least one display element that is preprogrammed into the interactive television program guide, the system comprising:

means for allowing the operator to supply a first markup language document to the interactive television program guide without intervention by the user, wherein the first markup language document indicates how the preprogrammed display element is to be displayed by the interactive television program guide on the user television equipment;

control circuitry configured to interpret the first markup language document using the interactive program guide, and to generate a first program guide display screen containing the preprogrammed display element displayed as indicated by the interpreted first markup language document using the interactive television program guide;

means for allowing the operator to supply a second markup language document to the interactive television program guide without intervention by the user when the operator desires to update the display characteristics of the first interactive program guide display screen, wherein the second markup language document indicates how the preprogrammed display element is to be displayed by the interactive television program guide on the user television equipment; and control circuitry configured to interpret the second markup language document using the interactive program guide and configured to generate a second program guide display screen to replace the first program guide display screen, the second program guide display screen containing the preprogrammed display element displayed as indicated by the interpreted second markup language document using the interactive television program guide, wherein the display characteristics of the second program guide display screen are different from the display characteristics of the first program guide display screen.

24. The system defined in claim 23 wherein:

the first markup language document indicates a first position for the preprogrammed display element;

the control circuitry is further configured to generate the first program guide display screen containing the preprogrammed display element at the first position using the interactive television program guide;

the second markup language document indicates a second position for the preprogrammed display element; and the control circuitry is further configured to generate the second program guide display screen containing the preprogrammed display element at the second position using the interactive television program guide.

25. The system defined in claim 23 wherein:

the first markup language document indicates a first size for the preprogrammed display element;

the control circuitry is further configured to generate first program guide display screen containing the preprogrammed display element with the first size using the interactive television program guide;

the second markup language document indicates a second size for the preprogrammed display element; and the control circuitry is further configured to generate the second program guide display screen comprises means for generating and displaying the second program guide display screen containing the preprogrammed display element with the second size using the interactive television program guide.

26. The system defined in claim 23 wherein:

the first markup language document indicates a first style for the preprogrammed display element;

the control circuitry is further configured to generate the first program guide display screen containing the preprogrammed display element with the first style using the interactive television program guide;

the second markup language document indicates a second style for the preprogrammed display element; and the control circuitry is further configured to generate the second program guide display screen containing the preprogrammed display element with the second style using the interactive television program guide.

27. The system defined in claim 23 wherein the control circuitry is further configured to interpret HyperText Markup Language documents.

28. The system defined in claim 23 wherein the control circuitry is further configured to interpret Dynamic HyperText Markup Language documents.

29. The system defined in claim 23 wherein the control circuitry is further configured to interpret Extensible Markup Language documents.

30. A system for allowing an operator to update the functionality of an interactive television program guide that generates program guide display screens for display on a user's television equipment, wherein television programming is displayed on the user television equipment and television program listings information is displayed on the user television equipment in a program guide display screen having at least one display element having at least one associated action that is preprogrammed into the interactive television program guide, the system comprising:

means for allowing the operator to supply a first markup language document to the interactive television program guide without intervention by the user, wherein the first markup language document assigns a first preprogrammed action associated with the display element;

control circuitry configured to interpret the first markup language document using the interactive program guide and to generate the program guide display screen containing the display element and selecting the first preprogrammed action for the display element as assigned by the interpreted first markup language document using the interactive television program guide;

means for allowing the operator to supply a second markup language document to the interactive television program guide without intervention by the user when the operator desires to update the functionality of the interactive television program guide, wherein the second markup language document assigns a second preprogrammed action to the display element that is different than the first preprogrammed action; and control circuitry configured to interpret the second markup language document using the interactive television program guide and to generate the program guide display screen containing the display element and selecting the second preprogrammed action for the display element as assigned by the interpreted second markup language document.

31. The system defined in claim 30 wherein the control circuitry is further configured to interpret Hyper Text Markup Language documents.

32. The system defined in claim 30 wherein control circuitry is further configured to interpret Dynamic Hypertext Markup Language documents.

33. The system defined in claim 30 wherein control circuitry is further configured to interpret Extensible Markup Language documents.

* * * * *